(No Model.)
E. NORTON.
SHEET METAL CAN AND THE ART OF MANUFACTURING THE SAME.
No. 370,404. Patented Sept. 27, 1887.
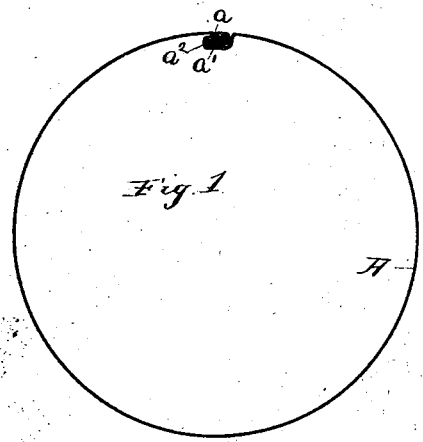
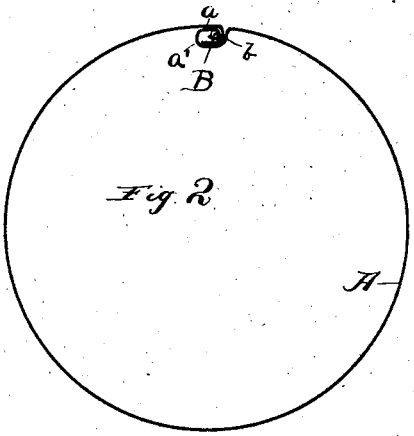
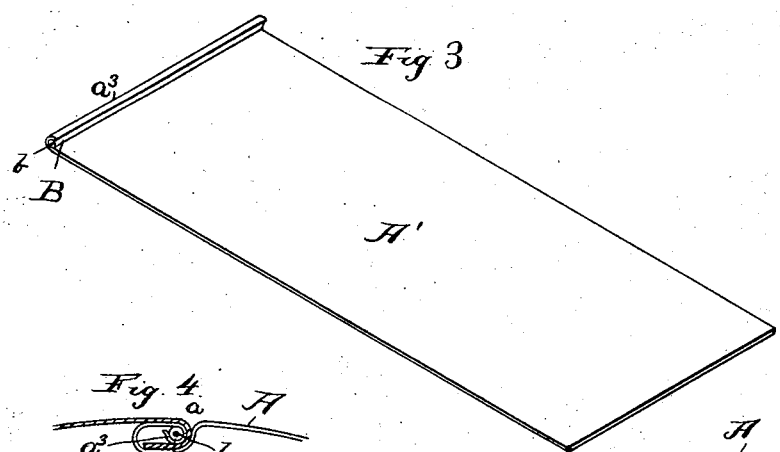
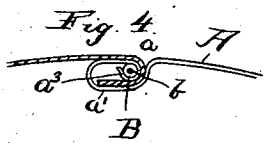
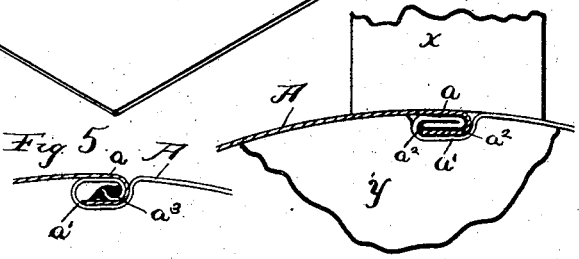
Witnesses:
Lew. E. Curtis.
H. W. Munday.
Inventor
Edwin Norton.
By Munday, Evarts & Adcock
his Attorneys.

United States Patent Office.

EDWIN NORTON, OF CHICAGO, ILLINOIS, ASSIGNOR TO HIMSELF AND OLIVER W. NORTON, OF SAME PLACE.

ET-METAL CAN AND THE ART OF MANUFACTURING THE SAME.

SPECIFICATION forming part of Letters Patent No. 370,404, dated September 27, 1887.

Application filed December 18, 1886. Serial No. 221,909. (No model.)

*To all whom it may concern:*

Be it known that I, EDWIN NORTON, a citizen of the United States, residing in Chicago, in the county of Cook and State of Illinois, have invented a new and useful Improvement in Sheet-Metal Cans and the Art of Manufacturing the Same, of which the following is a specification.

The seams of sheet-metal cans have heretofore usually been soldered by applying the solder to the one side or the other of the seam. Where the solder is applied to the seam upon the inside of the can, objection has been made by reason of the contents of the can coming in contact with the exposed solder. Where the solder is applied to the seam from the outside of the can, the solder is always more or less smeared over the outside of the can and seam, and the exposed solder renders the can unsightly in appearance. Whether the solder is applied to the folded seam upon the inside or outside of the can, the folds of the seam are often soldered together only at or near the edge of the seam to which the solder is directly applied, and in order to insure the sweating or flowing of the solder through the interior folds or parts of the joint or seam a considerable amount of solder is necessarily applied, and when thus applied—for example, at the outside of the can-seam—in sufficient amounts to insure the soldering of the interior folds of the joint the solder will frequently flow entirely through the seam, and thus be exposed upon the inside of the can and come in contact with the contents thereof.

It is the object of my invention to produce a can which will at once overcome these objections incident to both the outside and the inside soldered seams, and to provide a simple, expeditious, and inexpensive method or process of manufacturing the same.

In my improved can or sheet-metal seam the solder is embraced wholly within or between the folds of the seam, and is spread neither upon the inside nor the outside thereof, so that the contents cannot come in contact with the solder, while the outside of the can is preserved as neat and smooth as if the solder were applied from the inside of the can; and as no portion of the solder is spread either upon the inside or the outside of the seam, a great saving is effected in the amount of solder employed, as no more need be used than is necessary to unite the close-lying folds of the seam together.

In my invention the folds of the seam may be of any desired form or kind; but preferably I employ the ordinary interlocked-fold seam. The solder in a solid state, and preferably in the form of a fine wire, is applied within and between the interior folds of the seam, preferably at the time the folds are made or when they are interlocked together. The solid solder should thus be introduced as near the middle or center of the seam or folds as practicable. After the solid solder has thus been introduced within or between the folds of the seam, the seam is heated until the solder is melted, when it will spread or flow through the seam between the folds thereof.

To facilitate the even distribution of the solder between the folds of the seam from the interior toward each edge of the seam, I apply external pressure to the seam after the solder is therein melted, whereby the folds of the seam are at once squeezed close and flat together and the solder forced or pressed from the interior central part of the seam toward each edge between the folds. The amount of solder applied should be just sufficient to distribute itself through the seam or between the folds thereof, but not enough to cause a surplus of solder to be forced out at the inside or outside of the seam. The folds of the seam being thus squeezed flat and close together while the solder is molten, a comparatively small amount of solder will suffice to thoroughly solder and firmly unite together all the folds of the seam. The flux is also preferably applied to the interior of the seam at the same time the solder is applied, and with it. The solder-wire used for this purpose is provided with a fine bore or filament of flux. But while my invention consists, in its most improved form, in applying the solder and flux within the folds of the seam in the form of fine wire furnished with a filament of flux, I desire it to be distinctly understood that my invention, in its broader features, is not confined to any particular form in which the solid solder or flux may be applied within the folds of the seam. The joint or seam, for example, may be fluxed after the wire solder is interposed therein, and any suitable kind of flux or acid may be employed.

In practicing my invention I preferably first partially fold or roll one edge of the sheet around or partially around a piece of combined solder-wire and flux, such as shown and described in the pending application, No. 197,779, of myself and John G. Hodgson, filed April 5, 1886. The sheet thus prepared is then placed in a body-former or side-seam-folding machine and the folds of the seam formed and interlocked together; or the folds of the seam may be formed and interlocked in any other suitable way. The solder and flux are thus inclosed within the folds of the seam near the center or middle thereof. The can-body thus formed should then be placed upon a suitable mandrel and the seam heated until the solder and flux are melted. The heat may preferably be applied to the seam by means of gas-jets. As soon as the solder is melted external pressure is applied to the seam, whereby the folds of the seam are forced close together and the solder and flux forced through the folds of the seam.

In the accompanying drawings, which form a part of this specification, and in which similar letters of reference indicate like parts, Figure 1 is a cross-sectional view of the can-body embodying my invention. Fig. 2 is a similar view showing the folds of the seam with the combined solder-wire and flux therein before the same is melted and before the folds or walls of the seam have been compressed. Fig. 3 is a perspective view showing a sheet-metal blank with its edge folded or rolled over the wire solder and flux, ready to be formed into a can-body. Fig. 4 is an enlarged view of the seam as shown in Fig. 2. Fig. 5 is a view similar to Fig. 4, showing the solder-wire after it is melted, but before the seam is squeezed; and Fig. 6 is an enlarged view of the seam as shown in Fig. 1, and showing also a portion of the mandrel and of the seam presser, squeezer, or plunger.

In said drawings, A represents a can-body, $a$ $a'$ the folds of the seam, and $a^2$ the solder by which the folds are united together. In Fig. 6 the solder is represented by the black line, and the same extends between all the folds $a$ $a'$ of the seam from the interior of the seam to the outer edge or part of the same, while at the same time the solder is entirely embraced and inclosed by the folds of the seam, and is not spread upon either the inside or the outside of the can.

B is the solder-wire, furnished with a core or filament of flux, $b$.

A' represents the sheet which forms the body of the can before it is formed up. The solder and flux wire B $b$ is embraced and held by a fold or roll, $a^3$, at the edge of the sheet A'. The sheet A' may be thus wired with the solder-wire in any suitable manner—as, for example, in the ordinary manner in which sheets of tin are wired with iron or steel wire for the purpose of strengthening them. The fold $a^3$ should not, however, entirely embrace the solder flux wire B $b$, so that this fold $a^3$ will properly flatten out, as indicated in Fig. 6, after the solder-wire has been melted. Figs. 4 and 5 show about the extent that the fold $a^3$ should embrace the solder-wire flux B $b$. When the sheet A' has been thus wired with solder-wire flux, it is next formed into a can-body and side-seam folds $a$ $a'$ formed on its opposite edges, as indicated in Figs. 2 and 4. The can-body, with its side-seam folds interlocked, as shown in Fig. 4, is then placed upon a mandrel or other support and heat applied to the seam, preferably by gas-jets, until the solder is melted. The molten condition of the solder is roughly shown in Fig. 5. External pressure is then applied to the seam and the folds of it pressed close together, as indicated in Fig. 6, thus distributing the solder and flux through the folds of the seam. The pressure may be applied by any suitable plunger or former, as indicated at $x$ in Fig. 6, $y$ indicating the mandrel.

I have shown and described my invention as applied to the side seam of an ordinary sheet-metal can. It may, however, be applied to other seams.

I prefer to apply the solder and flux in the form of wire solder flux, as hereinbefore described, and to secure the same within a fold or roll at the edge of the sheet. The solder in other suitable form may, however, be applied to the edge of the sheet or within the folds of the seam after the same are wholly or partially formed in any suitable manner, the essential feature of my invention being the application of the solder within the folds of the seam and then melting the solder and distributing it through or between the folds of the seam, so that the solder flows outward from the interior portion of the seam, instead of from the exterior inwardly, thus enabling me to preserve the bright and untarnished appearance of the can or vessel upon both the interior and exterior thereof after the seam has been soldered.

I hereby disclaim the method of soldering seams shown and described in the patent, No. 243,232, to A. H. Fancher, dated June 21, 1881, and which consists, essentially, in first turning the edges of the metal as required to interlock them, then inclosing the solder-wire between the two interlocked parts or folds of the seam, and then heating the seam to melt the solder. In my invention the solder-wire is first attached to the edge of the sheet, and the interlocking folds of the seam are afterward formed and interlocked together in the usual way, the same act thus serving to introduce the solder-wire within the folds of the seam without additional labor or expense.

I claim—

1. As a new article of manufacture, a sheet-metal blank having its edge wired with or folded over solder-wire for soldering the same, whereby the solder-wire is attached to the sheet and adapted to be embraced within the folds of the seam by and at the time said edge of the sheet is folded and interlocked to form the seam, substantially as specified.

2. The process or method of soldering sheet-metal seams, consisting in first folding the edge of the sheet over a solder-wire, and thus attaching the solder-wire to the sheet, then folding the edges of the sheet to be united together into a seam, whereby the solder in a solid state is embraced within the folds of the seam, and then heating the seam to melt the solder, substantially as specified.

3. The process or method of soldering sheet-metal seams, consisting in first folding the edge of the sheet-metal blank over a solder-wire provided with a filament of flux to attach such solder-wire thereto, then folding the edges of the sheet to be united together into a seam, and thus embracing the solder in a solid state and the flux within the folds of the seam, and then heating the seam, substantially as specified.

4. The process or method of soldering sheet-metal seams, consisting in first introducing the solder in a solid state within the folds of the seam, and then melting the solder, so that it may flow from the interior of the seam outward, and finally applying external pressure to the seam to compress the folds of the seam close together and force the solder outward, substantially as specified.

5. The process or method of soldering sheet-metal seams, consisting in first introducing the solder in a solid state within the folds of the seam, together with the flux, then applying heat to the seam to melt the solder and flux, and then compressing the folds of the seam, substantially as specified.

6. The process or method of forming sheet-metal seams, consisting, first, in folding th edge of the sheet over a piece of combined wire-solder and flux, then folding such solder-wired edge of the sheet with another edge of a sheet into a folded, rolled, or interlocked seam, then applying heat to such seam to melt the solder and flux, and finally compressing the seam, substantially as specified.

7. The process of soldering sheet-metal seams, consisting in first providing one or both edges of the sheet with the requisite amount of solder attached thereto, then folding the edges of the sheet to be united together into a seam, whereby the solder in a solid state is embraced within the seam, and then heating the seam to melt the solder, substantially as specified.

EDWIN NORTON.

Witnesses:
  H. M. MUNDAY,
  EDW. S. EVARTS.